United States Patent [19]

Woodley

[11] Patent Number: 4,595,327
[45] Date of Patent: Jun. 17, 1986

[54] CASSETTE STORAGE AND FEEDER MECHANISM

[75] Inventor: George M. Woodley, Shrewsbury, Mass.

[73] Assignee: King Instrument Corporation, Westboro, Mass.

[21] Appl. No.: 655,359

[22] Filed: Sep. 27, 1984

[51] Int. Cl.$^4$ .............................................. B65G 59/06
[52] U.S. Cl. ................................... 414/126; 198/395; 198/399; 221/173; 242/56 R; 360/92; 414/31
[58] Field of Search ................ 360/91, 92, 94, 71; 414/31, 32, 125, 126; 221/171, 173, 301; 29/806; 198/394, 395, 399; 242/56 R, 58.6

[56] References Cited

U.S. PATENT DOCUMENTS

| | | | |
|---|---|---|---|
| 3,338,373 | 8/1967 | Aidlin et al. | 198/399 X |
| 3,512,786 | 5/1970 | Ban | 360/92 |
| 3,881,605 | 5/1975 | Grossman | 414/754 X |
| 4,061,286 | 12/1977 | King, Sr. et al. | 242/56 R |
| 4,078,698 | 3/1978 | Bosco | 221/171 |
| 4,271,955 | 6/1981 | Berube | 198/400 |
| 4,332,355 | 6/1982 | Zopfy et al. | 242/56 R |
| 4,377,111 | 3/1983 | Kincheloe et al. | 414/31 X |
| 4,415,301 | 11/1983 | Zielke | 414/31 |
| 4,438,468 | 3/1984 | Kamei et al. | 360/92 |

Primary Examiner—Leslie J. Paperner
Attorney, Agent, or Firm—Schiller & Pandiscio

[57] ABSTRACT

A novel cassette storage and feeder mechanism for a tape winding machine, comprising (a) storage chute for storing a plurality of empty cassettes randomly disposed in one or the other of first and second predetermined orientations, (b) a gate for discharging cassettes one at a time from said storage chute, (c) cassette orienter for causing each discharged cassette disposed in said first orientation to be shifted to said second orientation, and (d) a feeder for carrying cassettes away from said cassette orienter and supplying them one at a time to a tape loading station on the tape winding machine with the uniform desired orientation.

8 Claims, 19 Drawing Figures

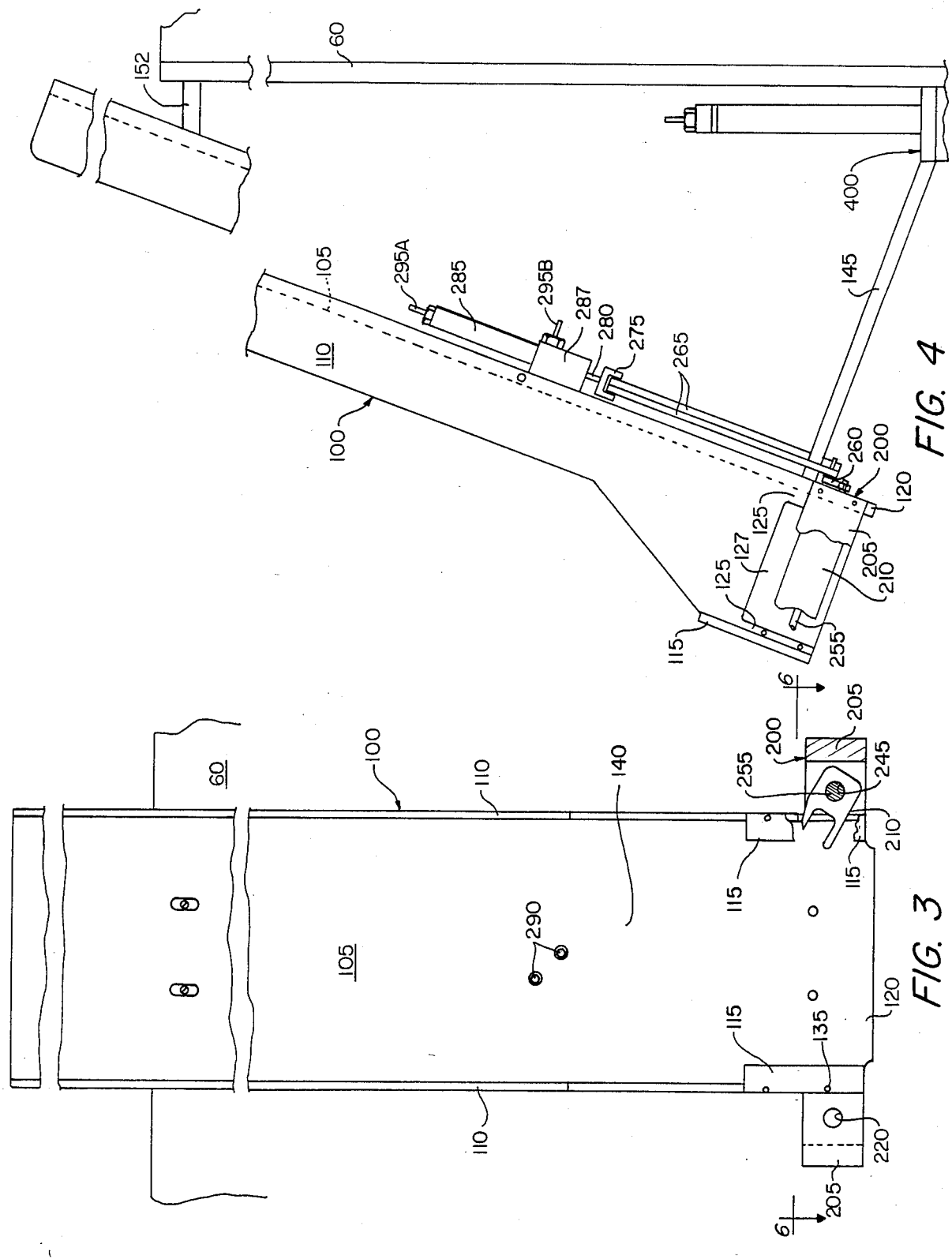

CASSETTE STORAGE AND FEEDER MECHANISM

FIELD OF THE INVENTION

This invention relates to tape winding machines in general, and more particularly to cassette storage and feeder mechanisms of the sort adapted for use with tape winding machines.

BACKGROUND OF THE INVENTION

Tape winding machines are well known in the art. Such devices are generally used to transfer magnetic recording tape from the large supply reels typically prepared during tape manufacture to the smaller reels or cassettes generally utilized by commercially-available recording and playback equipment. See, for example, U.S. Pat. Nos. 3,637,153, 3,814,343, 3,940,080, 3,964,100, 3,997,123, 3,917,184, 4,061,286, 3,753,834, and 4,438,468.

Where the fresh tape is to be loaded into empty (i.e., C-ZERO) cassettes, it is sometimes desirable to provide the tape winding machine with a cassette storage and feeder mechanism for storing a plurality of empty cassettes and supplying them one at a time to a loading station on the tape winding machine. The use of such a cassette storage and feeder mechanism is advantageous since it allows the tape winding machine to be set up to run for prolonged periods of time with minimal operator supervision.

In their simplest (and earliest) forms, cassette storage and feeder mechanisms have generally comprised (a) a storage magazine in the form of a vertical storage chute having a rectangular cross-section sized so as to slidably constrain a plurality of cassettes stacked one on top of another, and (b) feeder means for removing the cassettes one at a time from the bottom end of the chute and delivering them to the loading station on the tape winding machine. In these simple cassette storage and feeder mechanisms, the cassettes are generally loaded into the top end of the storage chute by hand, conveyed to the bottom end of the chute by gravity, and thereafter transported to the tape winding machine's loading station via automatic feeder means. See, for example, U.S. Pat. Nos. 3,814,343, 3,940,080, 3,964,100, 3,997,123, 4,061,286, and 4,438,468.

Unfortunately, one problem which has been encountered with the simple cassette storage and feeder mechanisms described above is that of "open end" cassette orientation. More particularly, the empty cassettes which are to be filled with tape must all be received at the loading station of the tape winding machine with a specific orientation if the winding machine is to fill the cassettes with tape, i.e., the cassettes must be oriented in such a way that the end of the cassette which exposes the cassette's leader tape (the "open end" of the cassette) is oriented towards the winding machine's leader extractor mechanism. In this regard, it is to be appreciated further that most audio tape cassettes are of the type shown in U.S. Pat. Nos. 4,078,698 and 4,271,955, i.e., they have a stepped configuration and are thicker at their open ends than at their closed ends. As a result, the empty cassettes are generally packaged in their shipping cartons with an alternating open end orientation so that they pack evenly and efficiently. Hence, it is not feasible to simply transfer the cassettes from their shipping cartons to the vertical storage chute of the aforementioned storage and feeder mechanisms, without adjusting the orientation of approximately half of the cassettes, since this would result in approximately half of the cassettes being fed to the winding machine's loading station with their open ends being incorrectly oriented.

Initially, and to some extent even now, the problem was solved by having the winding machine's operator load all of the empty audio cassettes into the storage chute with the same orientation, i.e., so that all of the cassettes advance to the bottom end of the storage chute with their open ends facing in the desired direction. Such uniform cassette orientation at the bottom end of the storage chute then allows the cassettes to be quickly and easily advanced to the winding machine's loading station with the proper open end orientation for loading.

Unfortunately, this "brute force" solution to the cassette orientation problem suffers from a number of disadvantages. First, it mandates increased operator attendance at each machine. This is undesirable since production costs are thereby raised and productivity is thereby reduced. Second, by leaving the task of proper cassette orientation to a fallible human operator, the risk is increased that a cassette will be fed to the tape winding machine with an incorrect open end orientation. This is undesirable since the consequences of feeding an incorrectly oriented cassette to the tape winding machine are that the tape winding machine must then be deactivated long enough to remove the improperly oriented cassette.

A more elegant solution to the problem of audio cassette orientation is offered in U.S. Pat. No. 4,078,698. This patent teaches the idea of modifying the structure of the aforementioned cassette storage and feeder mechanisms so that a vertical orientation chute is interposed between the bottom end of the storage chute and the feeder means leading to the loading station on the tape winding machine. This orientation chute includes a sensing station at its top end where photoelectric sensors determine the orientation of the cassette as it is received into the orientation chute, and a "pivoting fin" mechanism disposed intermediate the length of the orientation chute which can be adjusted to selectively deflect a cassette falling in the chute so that the cassette will always arrive at the bottom end of the chute with its open end facing in a predetermined direction. The use of the cassette storage and feeder mechanism of U.S. Pat. No. 4,078,698 is advantageous since it allows cassettes to be quickly and easily loaded into the top end of the storage chute with substantially "random" (i.e., non-uniform) open end orientation, yet assures that the cassettes will still arrive at the winding machine's loading station with the requisite uniform open end orientation.

Unfortunately, the cassette storage and feeder mechanism disclosed in U.S. Pat. No. 4,078,698 is believed to suffer from several disadvantages. More particularly, because the cassette storage and feeder mechanism requires that the cassettes "free fall" in an orientation chute and be physically deflected by a pivoting fin mechanism as they fall in order for proper cassette orientation to be achieved, there exists the possibility that the cassettes may be damaged as they fall, either from striking the pivoting fin mechanism or from striking objects at the bottom end of the orientation chute. There also exists the possibility that the pivoting fin mechanism will fail during use. Furthermore, the cassette storage and feeder mechanism disclosed in U.S. Pat. No. 4,078,698 tends to be bulky.

U.S. Pat. No. 4,271,955 offers an alternative solution to the problem of audio cassette orientation. This reference also uses a vertical orientation chute, interposed between the bottom end of the storage chute and the feeder means leading to the loading station on the tape winding machine, to effect proper cassette orientation. The orientation chute of U.S. Pat. No. 4,271,955 effects uniform open end orientation of the cassettes through the use of first, second and third bars disposed about an opening at the top end of the orientation chute. These bars are arranged so that they extend substantially parallel to the path of movement of a cassette as it enters the chute, with the first and second bars being disposed on one side of the chute and vertically spaced from one another so as to define a horizontal channel therebetween which can accommodate the thinner closed end of a cassette but not the thicker open end of a cassette, and with the third bar being disposed on the opposite side of the chute at a vertical position corresponding to the vertical position of the lower of the first and second bars. In addition to the foregoing, the bars are arranged so that a cassette entering the chute will initially contact the first and second bars, but not the third bar. The bars cooperate with one another so that (1) when a cassette enters the orientation chute disposed so that its thinner closed end faces the first and second bars, the thinner end of the cassette will enter the aforementioned horizontal channel and the thicker open end of the cassette will not be supported by the third bar, so that the cassette will fall down the chute with its thicker open end in leading position, and (2) when a cassette enters the orientation chute disposed so that its open end faces the first and second bars, the thicker open end of the cassette will not enter the horizontal channel and the cassette will instead be shifted laterally by contact of the cassette with the first and second bars so that the cassette's thinner closed end rides along the top surface of the third bar, whereby the thicker open end of the cassette will be unsupported by the first and second bars and the cassette will fall down the chute, again with its thicker open end facing downwards.

Unfortunately, while the orientation chute taught in U.S. Pat. No. 4,271,955 is known to work, it also suffers from the possibility that cassettes may be damaged as they free fall to the bottom end of the orientation chute. In addition, the mechanism suffers from the further disadvantage that it tends to occupy a substantial amount of space.

The cassette storage and feeder mechanisms described and illustrated in U.S. Pat. Nos. 4,078,698 and 4,271,955 also suffer from another serious deficiency not previously noted. More particularly, the empty tape cassettes are frequently formed so that their front and back sides (i.e., their front and back principal face surfaces) are dissimilar from one another. For example, many empty tape cassettes have information displayed on one or both of their front and back sides. This information may be molded directly into the plastic of the cassette, or it may be printed onto the plastic of the cassette or onto labels affixed to the cassette. In any case, this information frequently differs from one side of the cassette to the other. Also, many empty cassettes are fastened together with screws which extend from one side of the cassette to the other. All of these screws typically extend in the same direction, so that one side of the cassette generally exposes the heads of the screws while the other side generally exposes the toes of the screws.

During manufacture, the empty cassettes are typically packaged in their shipping cartons not only so that their open ends are disposed with an alternating orientation as noted above, but also so that their front and back surfaces are uniformly oriented relative to one another (i.e., so that the front sides of the cassettes all face in a first direction, while the back sides of the cassettes all face in an opposite, second direction). In many circumstances (e.g. when loading prerecorded music into already labelled cassettes) it is essential that the empty cassettes be fed to the tape winding machine with this uniform front/back cassette orientation remaining intact, so that the tape will be properly loaded into the cassettes. Unfortunately, while it is a relatively simple matter to transfer the empty cassettes from their shipping cartons to the storage chute so that the cassettes' uniform front/back orientation is maintained, cassette storage and feeder mechanisms such as those shown in U.S. Pat. Nos. 4,078,698 and 4,271,955 tend to disrupt this uniform front/back orientation of the cassettes as they work to effect uniform open end orientation of the cassettes. Accordingly, the empty cassettes arrive at the loading station of the tape winding machine with uniform open end orientation but non-uniform front/back orientation. This is unacceptable in many applications.

U.S. Pat. No. 4,438,468 shows still another cassette storage and feeder mechanism. However, this mechanism is generally not preferred because of its mechanical complexity.

OBJECTS OF THE INVENTION

Accordingly, one of the objects of the present invention is to provide a new cassette storage and feeder mechanism which avoids the aforementioned problems associated with the prior art.

Another object of the present invention is to provide a cassette storage and feeder mechanism for a cassette loading machine whereby empty cassettes loaded into the top end of a storage chute with a "random" (i.e., non-uniform) open end orientation will be discharged to a loading station of the tape winding machine with a desired uniform open end orientation.

And other object of the present invention is to provide a cassette storage and feeder mechanism for a cassette loading machine whereby empty cassettes loaded into the top end of a storage chute with a "random" (i.e., non-uniform) open end orientation and a uniform front/back orientation will be discharged to a loading station of the tape winding machine with a desired uniform open end orientation without disturbing the cassettes' uniform front/back orientation.

A further object is to provide a cassette storage and feeder mechanism which does not require cassettes to "free fall" down an orientation chute in order to effect proper open end cassette orientation.

Still another object is to provide a cassette storage and feeder mechanism which is relatively compact, simple to make, cheap to manufacture, and reliable to operate.

Yet another object is to provide a cassette storage and feeder mechanism which is compatible with the control systems utilized in tape winding machines or the type described and illustrated in U.S. Pat. Nos. 3,637,153, 3,814,343, 3,940,080, 3,964,100, 3,997,123, 3,917,184, 4,061,286, and 3,753,834.

SUMMARY OF THE INVENTION

These and other objects are achieved by the present invention which provides a novel cassette storage and feeder mechanism comprising a storage chute, gate means, orientation means, and feeder means.

The storage chute has a top end and a bottom end and is formed with a suitable cross-section for slidably constraining a plurality of cassettes stacked one upon another and delivering them in series to the bottom end of the chute via gravity, with the cassettes being "randomly" oriented within the chute so that their thicker open ends all face in either a first predetermined direction or a second opposite direction.

The gate means is disposed at the bottom end of the chute and is adapted to discharge the "randomly" oriented cassettes one at a time from the bottom end of the chute.

The orientation means is disposed adjacent the bottom end of the chute and is adapted to (a) receive a cassette discharged from the bottom end of the chute, (b) preserve the orientation of those cassettes already oriented so that their thicker open ends face in the aforementioned second direction, and (c) modify the orientation of those cassettes which are received with their thicker open ends facing in the aforementioned first direction, so that they thereafter face in the aforementioned second direction. More specifically, the orientation means comprises an inclined rotatable platter or turntable adapted to receive a cassette discharged from the bottom end of the chute and to hold the received cassette on the platter if the thicker open end of the cassette faces in the aforementioned first direction or to allow the received cassette to slide off the platter if the thicker open end of the received cassette faces in the aforementioned second direction, rotation means for selectively rotating the platter 180 degrees, and control means for selectively activating the rotation means only when the thicker open end of the received cassette faces in the aforementioned first direction, whereby (1) when a cassette is received on the platter with its thicker open end facing in the aforementioned second direction, it will immediately slide off the platter with its thicker open end facing in the aforementioned second direction, and (2) when a cassette is received on the platter with its thicker open end facing in the aforementioned first direction, the control means will activate the rotation means to rotate the platter 180 degrees so that the cassette is re-oriented with its thicker open end facing in the aforementioned second direction, whereupon the cassette will thereafter slide off the platter with its thicker open end facing in the aforementioned second direction.

The feeder means is adapted to receive the cassette with its desired open end orientation from the orientation means and thereafter transport it to a loading station on the tape winding machine.

The new cassette storage and feeder mechanism does not disturb the front/back orientation of the cassettes as the cassettes advance from the mechanism's storage chute to the tape winding machine's loading station. Thus, cassettes loaded into the mechanism's storage chute with a uniform front/back orientation will always arrive at the tape winding machine's loading station with the same uniform front/back orientation.

BRIEF DESCRIPTION OF THE DRAWINGS

These and other objects and features of the present invention will be more fully disclosed or rendered obvious in the following detailed description of the preferred embodiment of the invention, which is to be considered together with the accompanying drawings wherein like numbers refer to like parts and further wherein:

FIG. 3 is a fragmentary front elevational view of the storage chute and the gate means of the preferred embodiment of the present invention, with selected portions broken away to show additional structure;

FIG. 4 is a fragmentary side elevational view of the storage chute and the gate means, with selected portions broken away to show additional structure;

DETAILED DESCRIPTION OF THE PREFERRED EMBODIMENT

Figure 1:
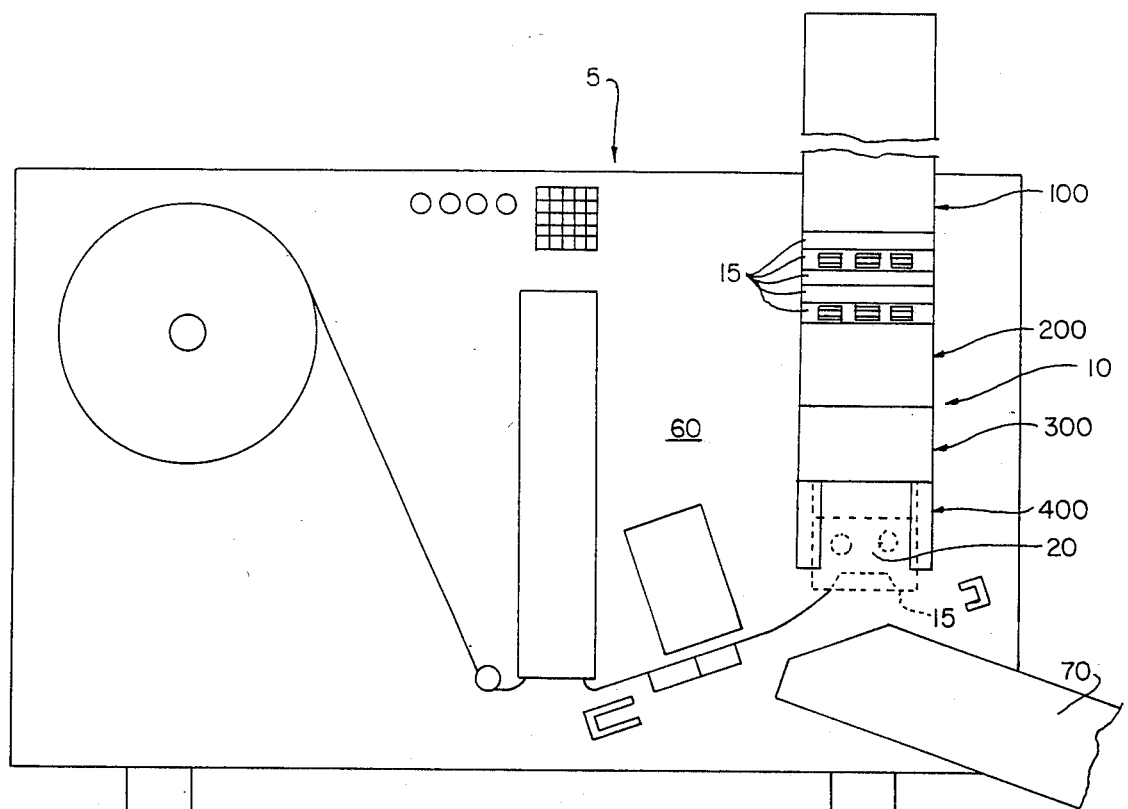
FIG. 1 is a fragmentary front elevational view showing a tape winding machine incorporating the preferred embodiment of the present invention, with selected portions of the preferred embodiment being shown in block diagram form so as to simplify the illustration.

Looking first at FIG. 1, there is shown a tape winding machine 5 upon which is mounted a cassette storage and feeder mechanism 10 for storing a plurality of empty cassettes 15 and supplying them one at a time to a loading station 20 on the front of the tape winding machine.

For the purposes of this invention, tape winding machine 5 may be any one of the many well known tape winding machines adapted to automatically fill a cassette with tape. By way of example, tape winding machine 5 could be a machine of the type manufactured by King Instrument Corporation of Westboro, Mass.

Figure 2:
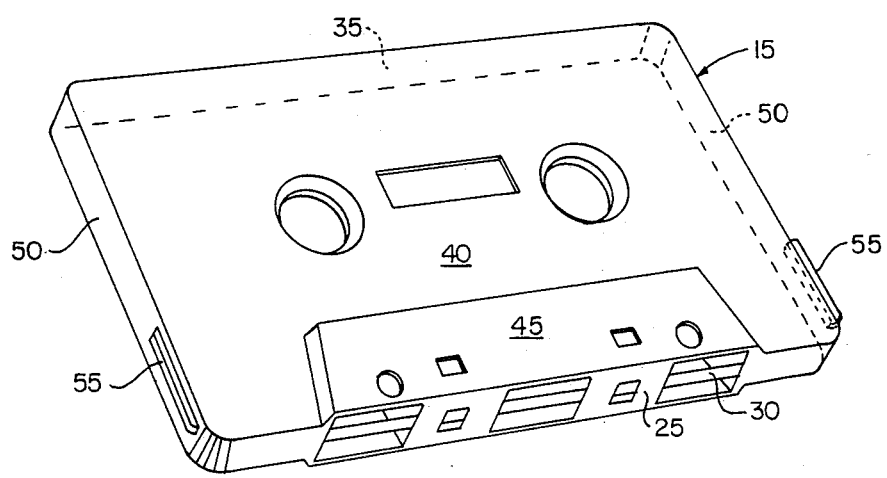
FIG. 2 is a perspective view of a typical tape cassette.

Furthermore, for the purposes of this invention, cassettes 15 are assumed to be cassettes of the type previously described, i.e., audio cassettes having a thicker open end and a thinner closed end. More particularly, cassettes 15 are assumed to be cassettes of the type shown in FIG. 2, wherein they comprise an open end 25 which exposes a leader tape 30, an opposite closed end 35, a pair of principal front/back face surfaces 40 (only one of which is shown), a relatively thick section characterized by a pair of adjacent raised front/back face surfaces 45 (only one of which is shown), and a pair of side walls 50 having side projections 55 extending outward therefrom. It is noted that cassettes of this type are frequently referred to as "Philips" cassettes within the industry.

Referring now back to FIG. 1, cassette storage and feeder mechanism 10 generally comprises a storage chute or magazine 100, a gate means 200 (shown in FIG. 1 in block diagram form so as to simplify the illustration), an orientation means 300 (shown in FIG. 1 in block diagram form so as to simplify the illustration), and a feeder means 400. Storage chute 100 is adapted to store a plurality of randomly or non-uniformly oriented cassettes 15 (i.e., cassettes stored so that their side walls 53 are aligned with one another but their open and closed ends 25 and 35, respectively, are not aligned with one another) stacked one upon another and deliver them one at a time to the bottom end of the chute. Gate means 200 is disposed adjacent the bottom end of the chute and is adapted to discharge the cassettes one at a time from the bottom end of the chute. Orientation means 300, disposed adjacent the bottom end of the chute, is adapted to receive a cassette from the bottom end of the chute, and preserve the orientation of the received cassette if it happens to be in the desired open end orientation or, if it is not in the desired open end orientation, rotate the received cassette 180 degrees so that it thereafter has the desired open end orientation. Feeder means 400 is adapted to transport the cassettes with their desired open end orientation from orientation means 300 to loading station 20 on the tape winding machine.

Looking now at FIGS. 1, 3–6 and 15, storage chute 100 comprises a back wall 105, a pair of parallel side walls 110 and, at its lower end, a pair of front guides 115, all secured together so as to form a single unit. Back wall 105 is substantially rectangular in shape and includes a narrowed bottom projecting portion 120 (FIGS. 3–5), Each side wall 110 includes a pair of legs 125 at its bottom end which together define a rectangular recess 127 (FIG. 4). Back wall 105, side walls 110 and front guides 115 cooperate with one another so as to define an interior channel 140 (FIGS. 3 and 6) having a substantially rectangular cross-section. Channel 140 is sized so as to be able to slidably constrain a plurality of cassettes 15 "randomly" (i.e., non-uniformly) stacked one on top of another, wherein the cassettes' side wall projections 55 engage the opposing interior surfaces of side walls 110 and the open ends 25 of the cassettes face either toward the chute's back wall 105 or 180 degrees away from the back wall, in the manner shown in FIG. 1.

Figure 15:
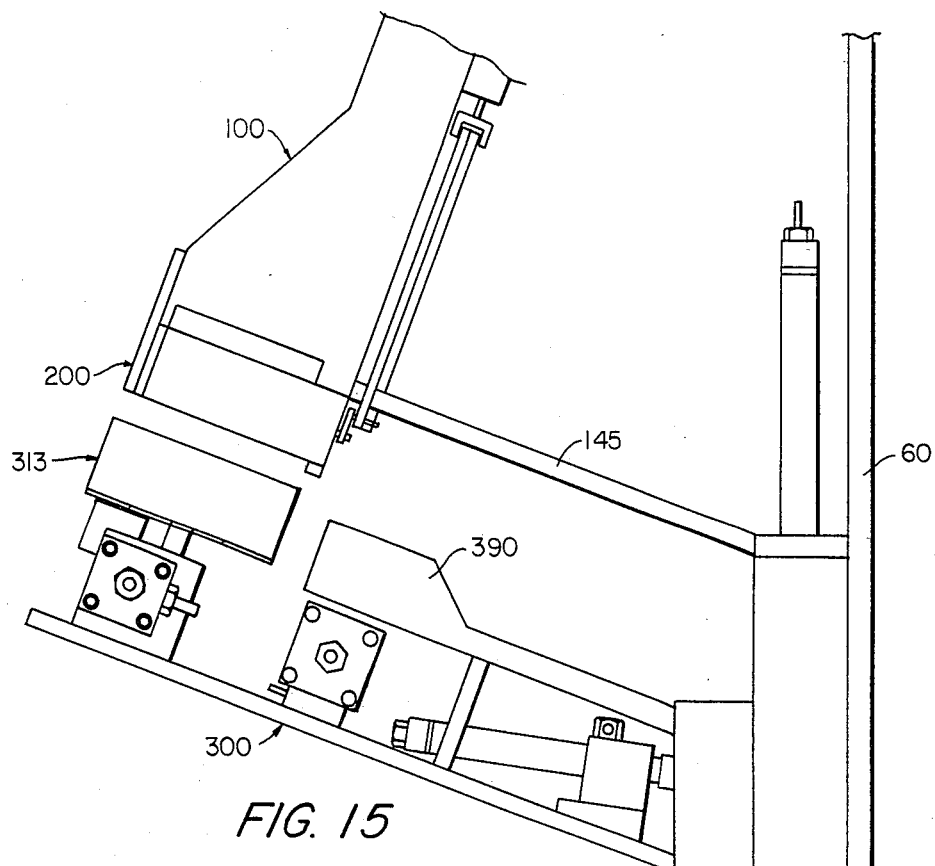
FIG. 15 is a fragmentary side elevational view showing the complete cassette storage and feeder mechanism mounted to the front panel of the tape winding machine via the feeder means.

Chute 100 is mounted to the front panel 60 (FIGS. 1, 3, 4 and 15) of tape winding machine 5 by a rigid lower support arm 145 (FIGS. 4 and 15) which extends between the chute and feeder means 400 (which is itself securely attached to front panel 60, as will hereinafter be described in further detail), and a rigid upper support arm 152 (FIGS. 4 and 5) which extends between the chute and front panel 60. More particularly, as seen in FIGS. 4 and 15, chute 100 is mounted so that the chute's flat back wall 105 is disposed at an inclined angle relative to the winding machine's vertical front panel 60. This inclined mounting arrangement serves to assure that any cassettes 15 loaded into the top end of the storage chute will remain in sliding contact with the chute's back wall 105 as the cassettes move down the chute, thereby eliminating the possibility of a cassette falling out of the front side of the chute prior to reaching front guides 115. As a consequence of the foregoing construction, a plurality of cassettes 15 loaded into the top end of storage chute 100 will gravity feed down to the lower end of the chute, arriving there one at a time in substantially parallel relation to one another.

Gate mechanism 200 is disposed at the bottom end of chute 100. As shown in detail in FIGS. 3–7 and 15, gate mechanism 200 comprises a pair of U-shaped side mounts 205 in which are pivotally mounted a pair of cassette cams 210. Side mounts 205 are affixed to bottom legs 125 of chute side walls 110 by screws so that the side mounts form limited enclosures around the recesses 127 in the bottom ends of the side walls. Each of the side mounts 205 has a pair of aligned bores 220 (FIGS. 3 and 6) that extend perpendicular to the major plane of the chute's back wall 105.

Figure 6:
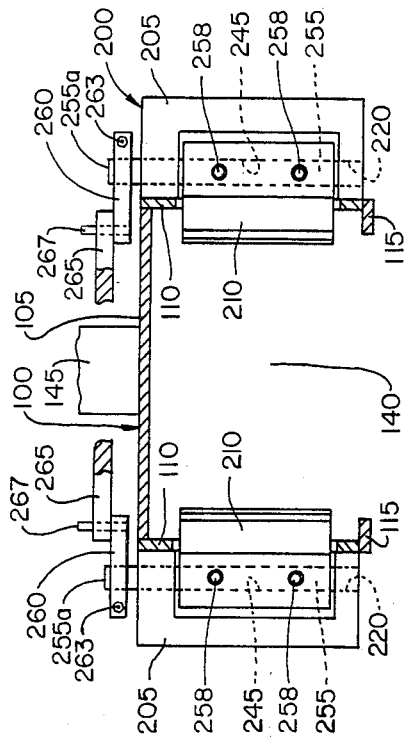
FIG. 6 is a sectional view taken along line 6—6 of FIG. 3.
Figure 7:
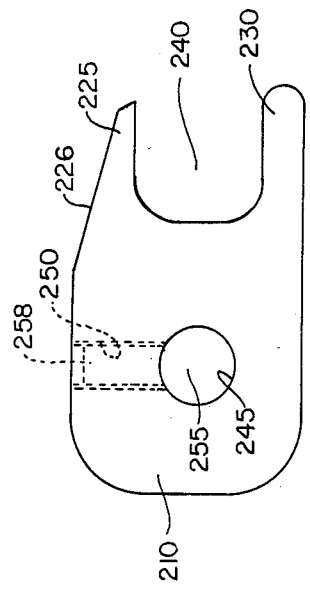
FIG. 7 is an enlarged side elevational view of one of the cassette cams of the gate means.

As seen in FIG. 7, each cassette cam 210 is somewhat block-like in shape, and includes an upper finger 225 and a lower finger 230. The upper surface of each finger 225 is inclined as shown at 226. Fingers 225 and 230 together define a side recess 240. Each side recess 240 is sized so as to be able to accept therein a side wall 50 (and also its associated side projection 55) of a cassette 15, in the manner hereinafter described in further detail. Each cassette cam 210 also includes a hole 245 extending through the width of the block (FIGS. 3, 6 and 7), and a pair of threaded bores 250 extending between the cam's top surface and its bore 245 (FIG. 7).

Each of the cassette cams 210 is pivotally mounted within a side mount 205 so it can selectively intrude its fingers 225 and 230 into interior channel 140 of storage chute 100 (FIGS. 3 and 6). More particularly, each cassette cam 210 has a pivot post 255 extending along its first bore 245 (FIGS. 3, 4, 6 and 7). Pivot posts 255 are secured to cams 210 by screws 258 which are disposed in cam bores 250 (FIGS. 6 and 7). Posts 255 project beyond the side edges of cassette cams 210 into the aligned bores 220 of side mounts 205. Posts 255 are rotatably received in bores 220 so that cassette cams 210 can rotate with respect to the side mounts 205. Cassette cams 210 are sized, and bores 220 are disposed, so that when the pivot posts 255 are rotatably mounted in side mounts 205, the fingers 225 and 230 of the two cams 210 will extend into the interior channel 140 of chute 100 through the recesses 127 formed in the bottom ends of side walls 110, in the manner shown in FIG. 3.

Figure 5:
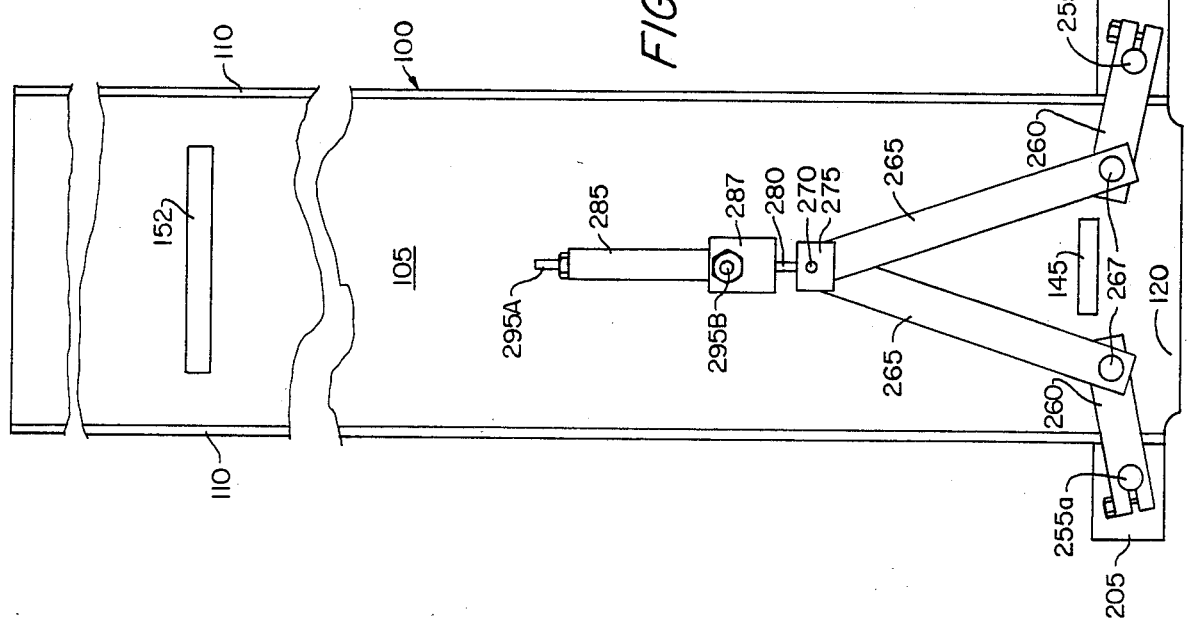
FIG. 5 is a fragmentary rear elevational view of the storage chute and the gate means.

Gate mechanism 200 also comprises means for rotating cassette cams 210 on command. More particularly, an end section 255a of each pivot post 255 projects through the rear side of side mount 205 (FIGS. 4–6). A lever 260 is releasably attached to each end section 255a. Each lever 260 is also pivotally connected by a pivot pin 267 to one end of a connecting lever arm 265 (FIGS. 4–6). The other ends of the two connecting lever arms 265 are pivotally joined to one another and to a pivot block 275 via a pivot pin 270 (FIGS. 4 and 5). Block 275 is affixed to the free end of the piston rod 280 of a double-acting pneumatic actuator 285. Actuator 285 has a mounting block 287 which is releasably attached to the rear side of the storage chute back wall 105 by a plurality of screws 290 (FIG. 3). Actuator 285 has air fittings 295A and 295B (FIGS. 4 and 5) for connecting it to a source of pressurized air via a suitable valving system (not shown).

It is to be appreciated that cassette cams 210 can be made to pivot in side mounts 205 by applying high pressure air to actuator 285 via one of the air fittings 295 and venting air from the actuator via the other fitting 295. More particularly, if pneumatic actuator 285 is stimulated by high pressure air so that its piston rod 280 is retracted upward, block 275 and lever arms 265 and 260 will cause cams 210 to rotate their fingers 225 and 230 in an upward direction. Conversely, if actuator 285 is stimulated so that its piston rod 280 is extended downward, block 275 and lever arms 265 and 260 will cause cassette cams 210 to rotate their fingers 225 and 230 in a downward direction.

Storage chute 100 and gate mechanism 200 together comprise a subassembly which operates as follows. Initially, when storage chute 100 is to be loaded with a plurality of cassettes 15, pressurized air is supplied to fitting 295B of actuator 285 so that cassette cams 210 rotate their fingers 225 and 230 (and thus also their central recesses 240) upward, to substantially the position illustrated in FIG. 3. Then cassettes 15 are "randomly" loaded into the top end of chute 100, i.e., so that the cassettes open ends 25 face either towards the chute's back wall 105 or 180 degrees away from the chute's back wall, in the manner shown in FIG. 1. The cassettes gravity feed downward within the chute until the bottommost cassette comes to rest on the cams' bottom fingers 230. The remaining cassettes, stacked one on top of another, are supported by the bottommost cassette resting on cams 210. Thereafter, when gate mechanism 200 is to release a cassette out of the bottom end of chute 100, actuator 285 is stimulated by the application of high pressure air to its fitting 295A so as to cause it to extend its piston rod 280, whereupon the cassette cams 210 will rotate downward. As cams 210 begin to rotate downward, upper fingers 225 pass between the lowermost cassette (which is received in the cams' side recesses 240) and the second-lowest cassette resting immediately above it. This allows the cams' upper fingers 225 to support the second-lowest cassette (and thus also all of the upper cassettes resting on it) while the cams continue their rotation downward, to the point where the cassette captivated in the cams' side recesses 240 is able to drop downward out of the bottom end of chute 100. Thereafter, when another cassette is to be released from the chute, actuator 285 is again stimulated by the application of high pressure air to its fitting 295B. This causes cassette cams 210 to rotate upward, until the lowest cassette in the stack drops past upper fingers 225 and into side grooves 240. Then actuator 285 is again stimulated so as to rotate cams 210 downward, so that the now-lowest cassette is first captivated in grooves 240 and then later drops downward out of the grooves and away from the chute. In this way, storage chute 100 can be made to store a plurality of "randomly" (i.e., non-uniformly) oriented cassettes stacked one upon another, and gate mechanism 200 can be made to serially discharge the cassettes—with their "random" open end orientation unaltered—from the bottom end of the storage chute by operation of pneumatic actuator 285.

Orientation means 300, disposed adjacent the bottom end of storage chute 100, is shown in detail in FIGS. 8-15. Orientation means 300 is adapted to (a) receive a cassette 15 discharged from the bottom end of storage chute 100, (b) preserve the orientation of those cassettes already oriented so that their thicker open ends face towards the chute's back wall 105, (c) reverse the orientation of those cassettes which are received with their thicker open ends facing away from the chute's back wall, so that they thereafter face towards the chute's back wall, and (d) discharge the properly oriented cassettes to feeder means 400. In this way, cassettes discharged from the bottom end of the storage chute with "random" (i.e., non-uniform) open end orientation may have their open end orientation made uniform before the cassettes arrive at the loading station on the tape winding machine.

Referring now to FIGS. 8-13, orientation means 300 comprises a flat base plate 303 on which is mounted a pneumatic actuator rotary drive mechanism 305. Rotary drive mechanism 305 is of a type well known in the art, wherein by selectively applying pressurized air to one or the other of its fittings 308A, 308B (FIGS. 9 and 10), the mechanism's drive shaft 310 can be made to rotate either clockwise or counterclockwise, respectively. By way of example, pneumatic rotary mechanisms of the type shown at 305 are manufactured by Rotomation, Inc. of Daytona, Fla.

Figure 8:
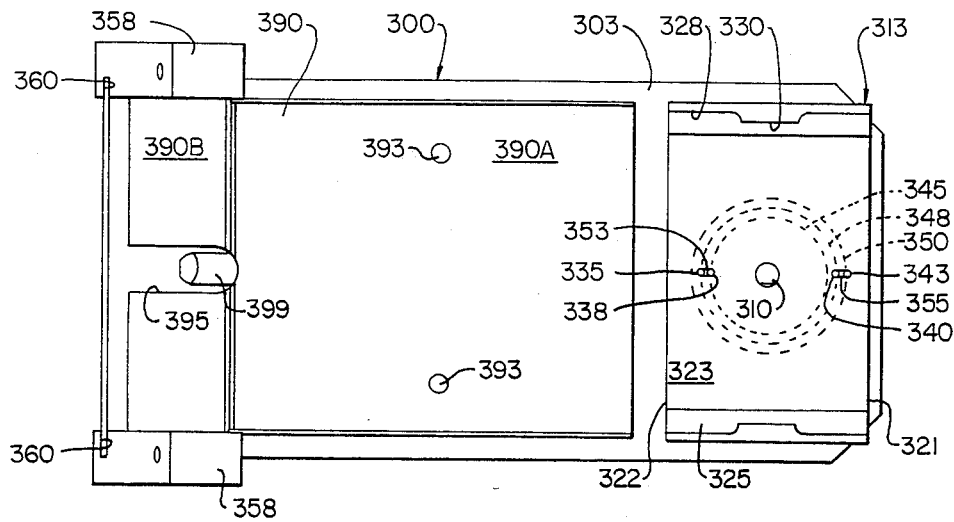
FIG. 8 is a top plan view of the orientation means of the preferred embodiment of the present invention.
Figure 9:
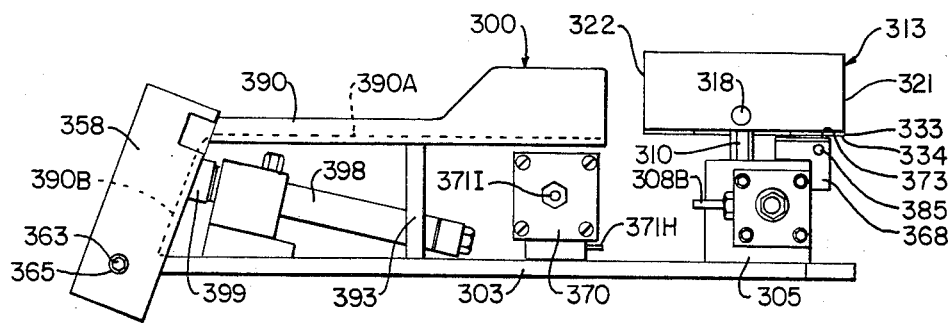
FIG. 9 is a side elevational view of the orientation means.
Figure 11:
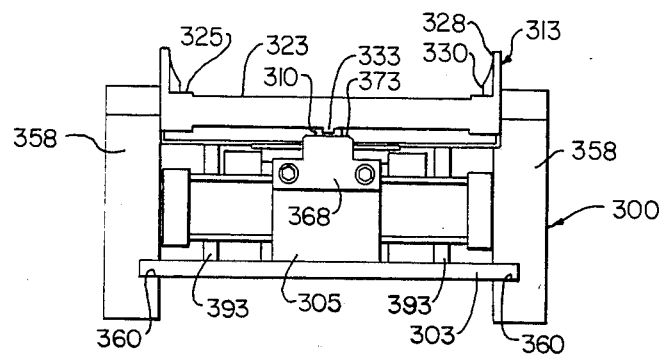
FIG. 11 is a front elevational view of the orientation means.
Figure 12:
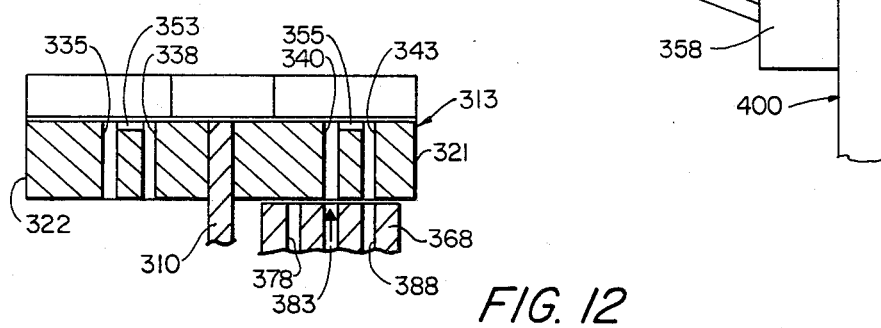
FIGS. 12 and 13 are cross-sectional views showing alternative positions of the cassette platter.
Figure 13:
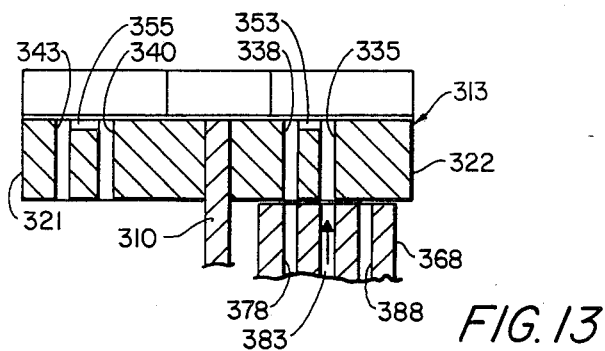

Attached to and supported by the rotary mechanism's drive shaft 310 is a cassette platter or turntable 313 (FIGS. 8, 9 and 11-13). Cassette platter 313 has a center hole for receiving shaft 310 (FIGS. 8, 12 and 13). The cassette platter is secured to shaft 310 by a set screw 318 disposed in a threaded horizontal hole in the turntable (FIG. 9). As seen in FIGS. 8, 9 and 11-13, cassette platter 313 has a "front" side 321, a "rear" side 322, and a stepped floor configuration comprising a center lower floor surface 323 and two side raised floor surfaces 325. The dimensional relationship between lower floor surface 323 and raised floor surfaces 325 is substantially the same as the dimensional relationship between the principal face surface 40 of a cassette 15 (FIG. 2) and its associated upraised face surface 45, in order that when a cassette resides on platter 313, the cassette's principal face surface 40 will rest flush on the platter's raised floor surfaces 325 and the cassette's raised face surface 45 will rest flush on the platter's lower floor surface 323. As best seen in FIGS. 8 and 11, platter 313 also has a stepped wall configuration comprising a base wall surface 328 and a projecting wall surface 330. The distance between the platter's two opposing base wall surfaces 328 is sized so as to be just slightly greater than the distance between the outermost surfaces of a cassette's two side edge projections 55, and the distance between the platter's two opposing projecting wall surfaces 330 is sized so as to be just slightly greater than the distance between the cassette's two side wall surfaces 50, in order that a cassette 15 may reside on platter 313 and (a) have its side wall surfaces 50 make a sliding fit with the platter's projecting wall surfaces 330 and (b) have its side edge projections 55 make a sliding fit with the platter's base wall surfaces 328.

In addition to the foregoing, cassette platter 313 also has a bottom rib 333 (FIGS. 9 and 11) extending between its "front" side 321 and its "rear" side 322. Bottom rib 333 includes a flat bottom surface 334. Rib 333 is bisected by the center hole which receives the rotary drive mechanism's drive shaft 310.

As seen in FIGS. 8, 12 and 13, rib 333 is also penetrated by four aligned holes 335, 338, 340, and 343 that extend through the platter parallel to drive shaft 310. As indicated in FIG. 8 by the circular dotted lines 345, 348 and 350 which represent the circular paths followed by holes 335, 338, 340 and 343, respectively, as the platter rotates a full 180 degrees, second hole 338 is disposed closest to drive shaft 310, first hole 335 and third hole 340 are disposed equidistant from the drive shaft, and fourth hole 343 is disposed furthest from the drive shaft. In addition to the foregoing, a groove 353 is provided in the platter's top surface 323 so as to connect first hole 335 and second hole 338, and a second groove 355 is provided in the platter's top surface 323 so as to connect third hole 340 and fourth hole 343 (FIGS. 8, 12 and 13).

Cassette platter 313 is located directly beneath the bottom end of storage chute 100 (FIGS. 1 and 15) in position to receive cassettes as they are discharged from the chute. More particularly, a pair of mounting blocks 358 (FIGS. 8-11 and 15) are mounted on one end of base plate 303 by fitting the opposing side surfaces of the base plate through a groove 360 (FIG. 8) formed in each mounting block. A pair of screws 363, disposed in a pair of bores 365 (only one each of which is shown, in FIG. 9), serve to secure mounting blocks 358 to base plate 303. Mounting blocks 358 extend at an acute angle relative to the major plane of base plate 303, in order that when the blocks are fastened to the front panel 60 of the tape winding machine via feeder means 400 (as shown in FIG. 15), base plate 303 (and hence cassette platter 313) will reside at an inclined angle relative to the plane of front panel 60. More particularly, mounting blocks 358 and base plate 303 are arranged so that base plate 303 (and hence cassette platter 313) will reside substantially parallel to the plane of the cassettes 15 stacked in storage chute 100 (FIG. 15). Mounting blocks 358, base plate 303 and rotary mechanism 305 also are arranged so that cassette platter 313 resides directly beneath the bottom end of storage chute 100 (FIGS. 1 and 15). The foregoing construction serves to assure that a cassette diecharged from the bottom end of storage chute 100 will be properly received by cassette platter 303.

Since cassette platter 313 resides at an inclined angle relative to the tape winding machine's front panel 60, a cassette deposited on platter 313 from storage chute 100 will be urged by gravity to slide off the platter towards front panel 60 (FIG. 15). More particularly, if a cassette arriving on platter 313 is oriented so that its open end 25 faces towards front panel 60, its side edge projections 55 will be positioned on the "machine side" of the platter's projecting wall surfaces 330 and the cassette will be free to slide off the platter towards the tape winding machine. However, if a cassette arriving on platter 313 is oriented so that its open end 25 faces away from front panel 60, the cassette's side edge projections 55 will not be positioned on the "machine side" of the platter's projecting wall surfaces 330, and engagement of the cassettes' side edge projections 55 with the platter's projecting wall surfaces 330 will effectively prohibit the cassette from sliding off the platter towards the tape winding machine.

The present invention utilizes the foregoing feature, in conjunction with the pivoting capability of the cassette platter, to effect uniform open end orientation of "randomly" oriented cassettes discharged from the bottom end of storage chute 100. More particularly, if a cassette 15 is deposited onto cassette platter 313 oriented so that its open end faces towards the machine's front panel 60, the slope of base plate 303 will cause the cassette to automatically slide off the platter towards the tape winding machine with its open end leading. However, if a cassette 15 is deposited onto platter 313 with its open end facing away from the winding machine's front panel 60, so that the platter's projecting wall surfaces 330 coact with the cassette's side projections 55 to prevent the cassette from automatically sliding off the platter towards the tape winding machine, rotary mechanism 305 will automatically operate to rotate platter 313 180 degrees so that now the cassette is oriented with its open end facing towards the tape winding machine. As a result, the slope of base plate 303 will then cause the cassette to automatically slide off the platter towards the tape winding machine with its open end leading. In this way, cassettes emerging from the bottom end of storage chute 100 randomly oriented in either of two possible open end orientations will be automatically subjected to re-orientation by 180 degree rotations of platter 313, but only if such re-orientation is necessary to allow the cassettes to slide off the platter by gravity toward the tape winding machine.

The present invention includes the provision of drive means for rotating the platter on command, and control means for selectively commanding the drive means to (a) maintain platter 313 fixed in position when no cassette is captivated on platter 313, and (b) rotate platter 313 180 degrees when a cassette is captivated on platter 313. In the preferred embodiment, the drive means and the control means therefor comprises the aforementioned rotary mechanism 305, plus a block 368 and a dual piloted amplifier valve 370, both of which are shown in FIGS. 9-13.

Figure 10:
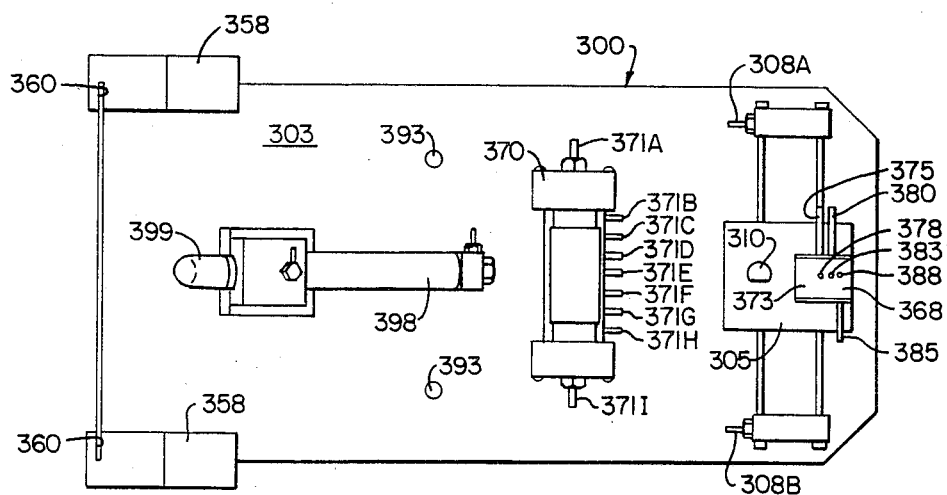
FIG. 10 is a top plan view of the orientation means, with selected parts removed to show additional structure.
Figure 14:
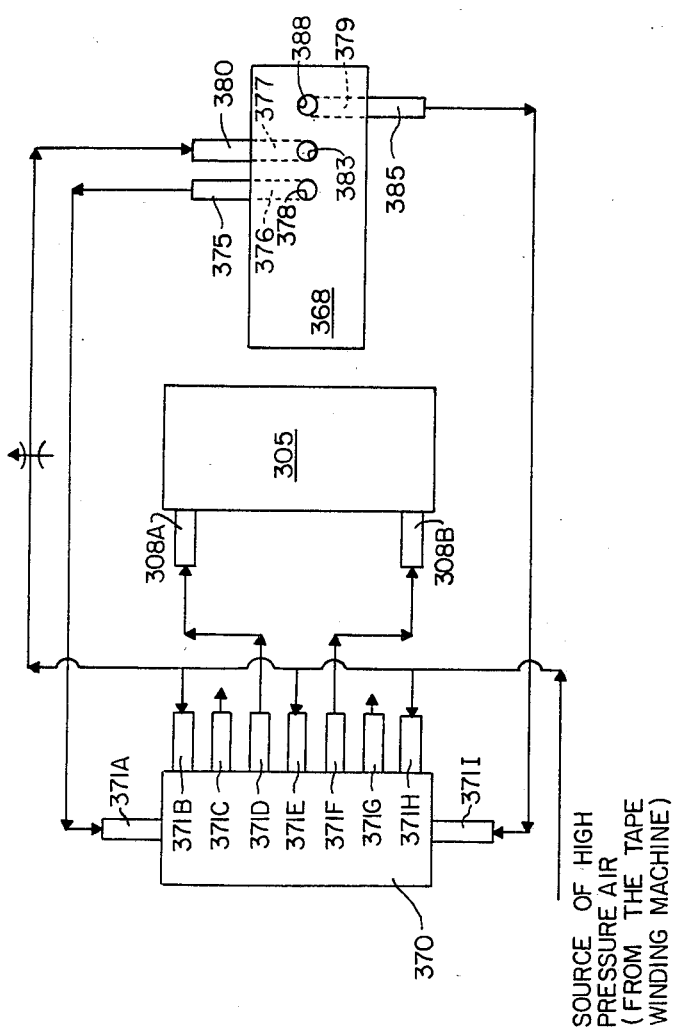
FIG. 14 is a schematic representation of selected portions of the orientation means.

Block 368 is affixed to the top side of rotary mechanism 305 (FIGS. 9 and 10) so that its top surface 373 makes a close sliding contact with bottom surface 334 of the platter's bottom rib 333. As seen in FIGS. 10 and 14, block 368 includes a first fitting 375 which is connected via an internal passageway 376 to a first opening 378 on the top surface of the block, a second fitting 380 which is connected via an internal passageway 377 to a second opening 383 on the top surface of the block, and a third fitting 385 which is connected via a third internal passageway 379 to a third opening 388 on the top surface of the block. As seen in FIGS. 12 and 13, block 368 is disposed so that its opening 378 is located the same distance from the platter's axis of rotation as the platter's second hole 338, its opening 383 is located the same distance from the platter's axis of rotation as the platter's first and third holes 335 and 340, and its opening 388 is located the same distance from the platter's axis of rotation as the platter's fourth hole 343.

Valve 370 is a standard pneumatic dual piloted amplifier valve of the sort well known in the art. For example, valve 370 (FIGS. 9, 10 and 14) may be an amplifier valve of the sort manufactured by Dynamco Inc. of Dallas, Tex. Essentially, amplifier valve 370 may be any dual piloted amplifier valve of the sort having 9 ports 371A-371I, wherein port 371E is adapted to be coupled to a source of high pressure air, ports 371B and 371H are adapted to be coupled to a source of pilot pressure air, ports 371C and 371G are exhaust ports for venting air to the outside atmosphere, ports 371A and 371I are adapted to be coupled to different sources of signal pressure air, and ports 371D and 371F are output ports for releasing different air flows depending on the signal pressures received at ports 371A and 371I.

As seen from the schematic diagram of FIG. 14, amplifier valve 370 has its input port 371E selectively coupled via a suitable hose (not shown) to a source of high pressure air in the tape winding machine, its pilot ports 371B and 371H coupled via a suitable hose (not shown) to the same source of high pressure air, its signal port 371A coupled via a suitable hose (not shown) to port 375 in block 368, its associated output port 371D coupled via a suitable hose (not shown) to input port fitting 308A of rotary mechanism 305, its signal port 371I coupled via a suitable hose (not shown) to port 385 in block 368, and its associated output port 371F coupled via a suitable hose (not shown) to input port fitting 308B of rotary mechanism 305. In addition, amplifier valve 370 has its two exhaust ports 371C and 371G open to the outside atmosphere.

The foregoing construction allows block 368 and amplifier valve 370 to regulate the operation of rotary mechanism 305 as follows.

If rotatable platter 313 is initially disposed so that its "rear side" 322 faces the tape winding machine, in the manner shown in FIGS. 8, 9 and 12, and pressurized air is then supplied to inlet 380 of block 368 as well as to fittings 371B, 371E and 371H of amplifier valve 370, the pressurized air will pass into inlet 380 of block 368 so that a stream of pressurized air passes upward out of the block's second opening 383 (FIG. 14). On account of the particular rotary disposition of platter 313, the air discharged from the block's second opening 383 will pass upward through hole 340 in platter 313 (FIG. 12). Now if at this point a cassette is disposed on platter 313 (on account of the fact that the cassette was received on the platter with the cassette's open end 25 oriented away from the tape winding machine, so that the cassette's side projections 55 coact with the platter's side projections 330 to prevent the cassette from sliding off the platter), the air discharged from the platter's third hole 340 will be deflected by one of the cassette's upraised faces 45 (FIG. 2) which lies flush against floor 323 of the platter, with the result that the discharged air will be forced along groove 355 and then down into the platter's hole 343 (FIG. 12). The discharged air stream will pass from hole 343 through opening 388 in block 368 (FIGS. 12 and 14), and then out of block 368 via fitting 385 and into amplifier valve 370 via fitting 371I (FIG. 14). Amplifier valve 370 responds to send a flow of air out of its outlet port 371F to rotary mechanism 305 via that mechanism's fitting 308B. This causes rotary mechanism 305 to rotate platter 313 180 degrees in a counterclockwise direction, thereby re-orienting the cassette so that its open end 25 now faces front panel 60 of the tape winding machine, with the result that the detained cassette will slide down off the platter onto a slide 390 hereinafter described which also forms part of the orientation means 300.

Conversely, if platter 313 is initially disposed so that its "rear side" 322 faces the tape winding machine, and if no cassette is disposed on the platter when pressurized air is supplied to inlet 380 of block 368, as well as to fittings 371B, 371E and 371H of amplifier valve 370 (on account of the fact that a cassette was deposited on the platter with its open end 25 oriented towards the tape winding machine, so that the cassette immediately slid off of the platter onto slide 390 because there was no interaction between the cassette's side projections 55 and the platter's side projections 330 to prohibit the cassette from sliding off the platter), the stream of pressurized air leaving opening 383 in block 368 and passing upward through hole 340 in platter 313 will escape directly into the atmosphere above platter 313 instead of being directed back down into platter hole 343 and hence into the amplifier valve's inlet port 371I. Consequently, no stream of pressurized air will be sent from the amplifier valve's outlet port 371F to the rotary mechanism's fitting 308B, with the result that the platter will remain stationary instead of being rotated counterclockwise.

Similarly, if the rotatable platter 313 is initially disposed so that its "front side" 321 faces the front panel of the tape winding machine, in the manner shown in FIG. 13, a similar but slightly different set of events will occur. More particularly, when a flow of pressurized air is supplied to inlet 380 of block 368, as well as to fittings 371B, 371E and 371H of amplifier valve 370, the pressurized air will once again pass into the inlet fitting 380 of central block 368 so that a stream of pressurized air will be discharged upward from the block's second opening 383 (FIG. 14). This time, however, on account of the different rotary disposition of platter 313, the air passing upward out of opening 383 will pass upward through hole 335 in platter 313 (FIG. 13). Now if at this point a cassette is disposed on platter 313 (on account of the fact that the cassette was received on the platter with the cassette's open end oriented away from the front panel of the tape winding machine, so that the cassette's side projections 55 coact with the platter's side projections 330 to prevent the cassette from sliding off the platter), the air stream passing upward out of hole 335 will be deflected by one of the cassette's upraised faces 45 which lies flush with floor 323 of the platter, whereby the air stream will travel along groove 353 and pass down into the platter's second hole 338 (FIG. 13). The discharged air will pass from hole 338 through opening 378 in block 368 (FIGS. 13 and 14) and then out of block 368 via fitting 375 and into amplifier valve 370 via its inlet port 371A (FIG. 14). Amplifier valve 370 responds to the stream of air received via its inlet port 371A by sending a stream of air out its outlet port 371D back to rotary mechanism 305 via that mechanism's fitting 308A, whereupon rotary mechanism 305 will rotate platter 313 180 degrees in a clockwise direction so as to re-orient the cassette so that its open end 25 now faces towards the tape winding machine, with the result that the cassette will slide freely off the platter onto slide 390.

However, if platter 313 is initially disposed so that its "front side" 321 faces the front panel of the tape winding machine, and if no cassette is present on the platter when pressurized air is supplied to fitting 371E of amplifier valve 370 (on account of the fact that a cassette was received on the platter with the cassette's open end 25 oriented towards the tape winding machine, so that the cassette immediately slid off of the platter onto slide 390 because there was no interaction between the cassette's side projections 55 and the platter's side projections 330 to prohibit the cassette from sliding off the platter), the flow of pressurized air passing from opening 383 in block 368 and passing upward through bore 335 in platter 313 will escape directly into the atmosphere above platter 313 instead of being directed back down into platter hole 338 and hence into the amplifier valve's inlet port 371A. Consequently, no flow of pressurized air will be sent to the rotary mechanism's fitting 308A to cause it to rotate the platter in a clockwise direction.

Referring back now to FIGS. 8, 9 and 15, the orientation means 300 includes a slide 390 to transport cassettes leaving platter 313 to feeder means 400. Slide 390 has a flat straight section 390A and a curved lower end section 390B. Slide 390 is secured to base plate 303 via a pair of fixed vertical posts 393 (FIGS. 8–11 and 15) so that one end of the slide's flat section 390A resides adjacent to platter 313 and is substantially parallel to the major planes of platter 313 and base plate 303. The slide's curved lower end section 390B extends between mounting blocks 358 (FIG. 8) and is spaced a short distance from the tape winding machine's front panel 60. The slide's curved lower end section 390B (FIG. 9) extends nearly parallel to the front panel 60. Slide 390 is sized and positioned so that the upper end of its flat section 390A is sufficiently close to platter 313 to allow a cassette to slip off platter 313 onto the slide, yet is spaced far enough from platter 313 to allow the platter to be rotated freely by rotary mechanism 305. The curved section 390B is spaced from front panel 60 just enough to allow a cassette dropping along slide 390 to enter feeder means 400.

Means are provided to "nudge" the cassette into a vertical position parallel to front panel 60 as it slides down along the curved section 390B of the chute, so as to assure that the cassette will be properly received by feeder means 400. More specifically, a double acting pneumatic actuator 398 (FIGS. 9 and 10) is mounted to base plate 303 so that it can selectively extend the enlarged head 399 of its piston rod (FIGS. 8–10) through a slot 395 formed in curved section 390B of the slide. Head 399 normally is retracted out of slot 395. Actuator 398 is operated so as to advance its head 399 through slot 395 as a cassette drops along curved section 390B of slide 390, whereby head 399 will force the cassette into a position substantially parallel to front panel 60.

Figure 16:
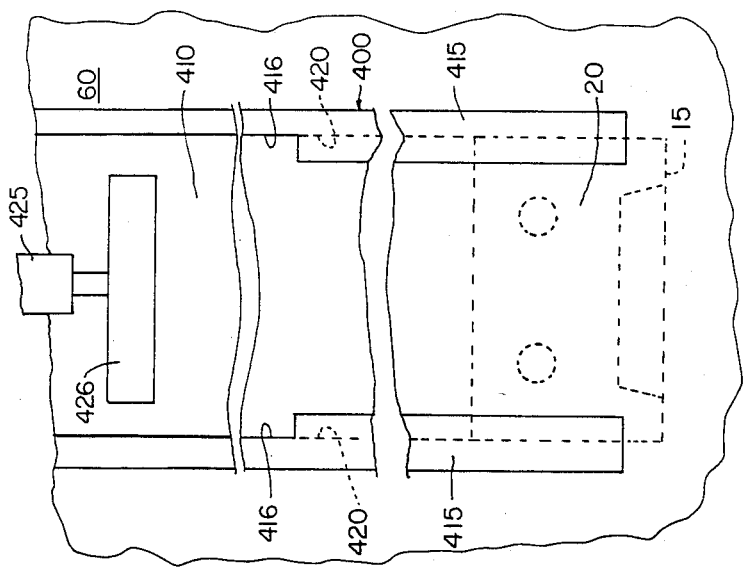
FIG. 16 is a fragmentary front elevational view showing the feeder means attached to the front panel of the tape winding machine.

Feeder means 400 is disposed adjacent to the lower end of the curved section 390B of slide 390. Feeder means 400 (shown in FIGS. 1, 15 and 16) is substantially the same as the feeder means shown in U.S. Pat. No. 4,061,286. Feeder means 400 is adapted to receive a cassette discharged by gravity from orientation means 300 at a location 410 (FIG. 16) and convey it down to a loading station 20 on the tape winding machine. To this end, feeder means 400 comprises a pair of spaced parallel rails 415 (FIG. 16) having interior opposing surfaces 420 which slidably constrain a cassette relative to the tape winding machine, and a cassette pusher mechanism comprising a pneumatic actuator 425 attached to a plate affixed to front panel 60 and a pusher member 426, for urging the cassettes from location 410 to loading station 20. Rails 415 are notched out as shown at 416 so as to provide an opening to accept a cassette falling off of slide 390. Friction means (not shown) attached to rails 415 serve to hold a cassette in place at the loading station while it is being loaded with tape. The pusher mechanism also serves to eject the cassette out of feeder means 400 to a conveyor chute 70 (FIG. 1) once the cassette is fully wound with tape.

Cassette storage and feeder mechanism 10 is intended to be utilized as follows. Initially, while the tape winding machine is being set up to run, gate means 200, orientation means 300 and feeder means 400 are all put into their starting positions and storage chute 100 is loaded with empty cassettes. To this end, gate means 200 has pressurized air supplied to fitting 295B of actuator 285 (FIG. 4), so that cassette cams 210 are positioned with their fingers 225 and 230 (and thus also their central recesses 240) extending upward, in substantially the position shown in FIG. 3. At the same time, orientation means 300 has a source of pressurized air selectively coupled to fittings 371B, 371E and 371H of amplifier valve 370, and pressurized air is also supplied to actuator 398 (FIG. 10) so as to cause it to withdraw its enlarged head 399 from slot 395 in slide 390. At the same time, feeder means 400 has pressurized air supplied to pneumatic actuator 425 so as to cause it to retract pusher member 426 upward as far as possible.

Next, cassettes 15 are loaded with "random" (i.e., non-uniform) open end orientation into the top end of chute 100. The stack of cassettes rests on the upper fingers 225 of cams 210. It will be appreciated that if the cassettes are loaded into the chute with "random" open end orientation, some of the cassettes will reside in the chute with their thicker open ends facing the chute's back wall 105, and the remaining cassettes will reside in the chute with their thicker open ends facing away from the chute's back wall.

When it is desired to have the tape winding machine load a cassette with tape, actuator 285 of gate mechanism 200 is operated by application of pressurized air so as to cause cams 210 to rotate first upward and then downward in the manner previously described, whereby the bottommost cassette in the storage chute will be released so as to fall down onto cassette platter 313.

If the cassette received by platter 313 is oriented so that its thicker open end faces the tape winding machine, the cassette's edge projections 55 will not engage the platter's side projections 330, and hence the cassette will immediately slide off the platter onto slide 390 and the platter will remain stationery since the pressurized air discharged from opening 383 in block 368 will pass upward through either hole 335 or hole 340 of platter 313 (depending on the rotary disposition of the platter, as described previously) and escape directly into the surrounding atmosphere.

However, if the cassette received by platter 313 is oriented so that its thicker open end faces away from the tape winding machine, the cassette's edge projections 55 will engage the platter's side projections 330 and thereby prevent the cassette from sliding off the sloped platter onto slide 390. In this case, the pressurized air discharged from opening 383 in block 368 will pass upward out of either hole 335 or hole 340 of platter 313 (depending on the rotary disposition of the platter, as described previously) but, on account of the thick portion of the cassette lying atop platter 313, the air stream passing up out of hole 335 or hole 340 will be deflected back down into either hole 338 or hole 343 of the platter, respectively, and thereby returned to amplifier valve 370 via either fitting 371A or 371I, respectively, in the manner previously described. This returning air flow causes amplifier valve 370 to transmit a corresponding air flow back to one or the other of the rotary mechanism's fittings 308A or 308B, respectively, thereby causing the rotary mechanism to rotate its drive shaft either clockwise or counterclockwise through an angle of 180 degrees. This platter rotation reverses the open end orientation of the cassette on the platter so that its thicker open end now faces the tape winding machine's front panel 60, whereupon the cassette will immediately slide off the platter onto slide 390.

The inclined angle of the slide (FIG. 15) causes the cassette to move down along the slide towards its curved end section 390B. As this occurs, a flow of pressurized air is directed to pneumatic actuator 398 so as to cause it to extend its enlarged head 399 out through slot 395 in the slide so as to contact the cassette and "nudge" it through the opening formed by notches 416 into a vertical position in feeder means 400, so that it extends parallel to front panel 60. The cassette is thus positioned with its thicker open end facing directly downward, and its principal face surfaces 40 extending substantially parallel to front panel 60, so that gravity will cause it to enter the track formed by parallel rails 415. Pusher actuator 425 is thereafter actuated by a flow of pressurized air so as to cause pusher member 426 to drive the cassette downward along the rails to loading station 20, whereupon the empty cassette may be filled with tape by the tape winding machine in ways well known in the art. It is to be noted that feeder means 400 is arranged so that another cassette will be deposited from slide 390 into the track formed by rails 415 while the first cassette is being loaded. Consequently, once the cassette in station 20 has been filled with tape, pusher actuator 425 will be energized once again to force the second cassette downward to loading station 20, and the loaded cassette will be forced by the second cassette out of feeder means 400 into product discharge chute 70.

Thereafter, the foregoing cycle is repeated to successively load tape into each cassette stored in chute 100.

It is to be appreciated that, on account of the particular construction of the new cassette storage and feeder mechanism, the front/back orientation of the cassettes is not disturbed as the cassettes advance from storage chute 100 to the tape winding machine's loading station 20, so that if cassettes are loaded into the storage chute with uniform front/back orientation, they will always arrive at the loading station 20 with the same uniform front/back orientation. This is due to the fact that operation of platter 313 can modify only the open end orientation of the cassettes.

MODIFICATIONS OF THE PREFERRED EMBODIMENT

It will, of course, be appreciated that the preferred embodiment may be modified in certain ways without departing from the scope of the present invention.

Thus, for example, it is possible to use a gate mechanism at the bottom end of the storage chute which is different than the one described and illustrated above. Also, the pneumatic components of the apparatus could be replaced with equivalent electrical components. Thus, for example, photoelectric sensing means could be used to detect when a cassette is located on platter 313, and electrically operated means may be used to rotate the platter on command.

Figure 18:
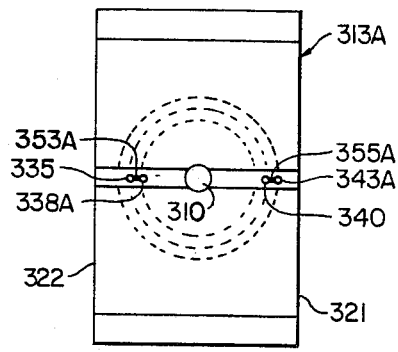
FIG. 18 is a bottom plan view of the modified cassette platter shown in FIG. 17.
Figure 17:
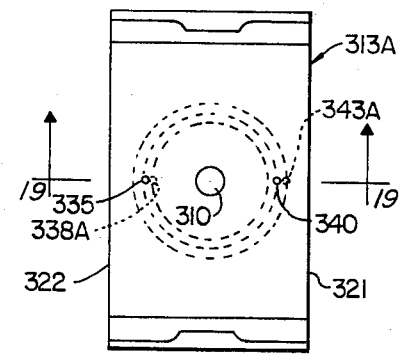
FIG. 17 is a top plan view of a modified form of cassette platter.
Figure 19:
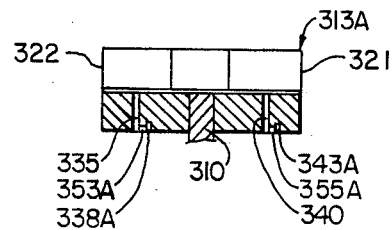
FIG. 19 is a sectional view taken along line 19—19 of FIG. 17.

Another possible modification is to substitute the cassette platter 313A shown in FIGS. 17-19 for the cassette platter 313 shown in FIGS. 8, 9 and 11-13. Cassette platter 313A is identical to cassette platter 313, except that (1) platter 313A has a blind hole 338A in place of the second hole 338 of cassette platter 313, (2) platter 313A has a bottom surface groove 353A in place of the top surface groove 353 of platter 313, (3) platter 313A has a blind hole 343A in place of the fourth hole 343 of platter 313, and (4) platter 313A has a bottom surface groove 355A in place of the top surface groove 355 of platter 313. As a consequence of the foregoing construction, when cassette platter 313A is mounted on the rotary mechanism's drive shaft 310 and is oriented so that it's "front" side 321 faces away from the front panel 60 of the tape winding machine, and a cassette is positioned on the platter so that the cassette's raised surfaces 45 block off the top end of hole 340, the application of pressurized air to fitting 380 of block 368 will result in an air stream exiting the block's opening 383 and being forced along bottom groove 355A to blind hole 343A so that it thereafter enters the block's opening 388. If no cassette is seated on cassette platter 313A when pressurized air is applied to fitting 380 of block 368, air will exit from the block's opening 383 and pass upward out of platter hole 340 and escape directly into the atmosphere, instead of being directed downward into the block's opening 388.

Similarly, if cassette platter 313A is oriented so that its "rear" side 322 faces away from front panel 60, and a cassette is seated on the platter so that the cassette's upraised surfaces 45 block off the top end of first bore 335, the application of pressurized air to fitting 380 of block 368 will result in air exiting from the block's opening 383 and travelling along bottom groove 353A to blind hole 338A, from which it enters the block's opening 378. However, with the platter in the same position, if no cassette is seated on cassette platter 313A and pressurized air is applied to fitting 380 of block 368, air will exit from the block's opening 383 and pass upward out of hole 335 and escape directly into the atmosphere, with the result that no air is directed into the block's opening 378.

Still other changes are considered to be obvious to one skilled in the art, and well within the scope of the present invention.

ADVANTAGES OF THE INVENTION

Numerous advantages are obtained by using the novel cassette storage and feeder mechanism which comprises the present invention.

First, the cassette storage and feeder mechanism allows cassettes to be stacked in a storage chute with a random, non-uniform open end orientation, yet feeds the cassettes to the loading station of a tape winding machine with a uniform open end orientation.

Second, the cassette storage and feeder mechanism allows cassettes to be stacked in a storage chute with a random, non-uniform open end orientation and a uniform front/back orientation, yet feeds the cassettes to the loading station of a tape winding machine with a uniform open end orienation without disturbing the uniform front/back orientation.

Third, the cassette storage and feeder mechanism effects proper orientation of the empty cassettes without subjecting them to the potentially harmful impact of a long "free fall" as occurs with some prior art cassette storage and feeder mechanisms.

Fourth, the cassette storage and feeder mechanism is compact, relatively simple to make and maintain, and provides reliable operation.

Still another advantage is that the cassette storage and feeder mechanism is compatible with the electrical and pneumatic control systems utilized in conventional tape winding machines, e.g. machines of the type described and illustrated in U.S. Pat. Nos. 3,637,153, 3,814,343, 3,940,080, 3,964,100, 3,997,123, 3,917,184, 4,061,286, and 3,753,834.

As used herein, the term "C-ZERO" designates an empty cassette which contains only leader tape connected to its two hubs, the term "random open end orientation" means that the tape cassettes are arranged so that their open (i.e, tape accessible) ends are in one or the other of two opposite predetermined orientations, the term "uniform open end orientation" means that the tape cassettes are arranged so that their open (i.e., tape accessible) ends all face in the same direction, the term "uniform front/back orientation" means that the tape cassettes are arranged so that their front sides all face in a first direction and their back sides all face in a second opposite direction, and the term "non-uniform thickness cassettes" means cassettes that have a greater thickness at one end as compared to a second opposite end thereof.

What is claimed is:

1. Cassette storage and feeder mechanism for storing a plurality of open end randomly oriented, C-ZERO, non-uniform thickness cassettes and supplying them one at a time to a loading station on a tape winding machine with a uniform open end orientation, said cassette storage and feeder mechanism comprising:
    (a) a storage chute having an open bottom end, said storage chute being adapted to slidably constrain a plurality of open end randomly oriented cassettes stacked one on top of another and deliver them one at a time to said bottom end;
    (b) gate means disposed at said bottom end of said chute, said gate means being adapted to discharge said cassettes one at a time from said bottom end of said chute without altering said random open end orientation of said cassettes;
    (c) orientation means adapted to (a) receive a cassette as it is discharged from said chute, (b) preserve the orientation of each received casette oriented in a first direction, and (c) reverse the orientation of each received cassette oriented in a second opposite direction, said orientation means comprising:
    an inclined rotatable platter;
    stop means disposed on said platter, said stop means being adapted to (a) maintain a received cassette on said platter if said received cassette is oriented in said second opposite direction, and (b) allow a received cassette to slide off said platter if said received cassette is oriented in said first direction;
    platter rotation means adapted to rotate said platter 180 degrees; and
    control means for selectively causing said rotation means to rotate, said control means being adapted to operate said rotation means only when a cassette is maintained on said platter, whereby (1) when a cassette oriented in said first direction is received on said platter, it will immediately slide off said platter, and (2) when a cassette oriented in said second direciton is received on said platter, said rotation means will rotate said platter 108 degress so as to orient said cassette in said first direction, whereupon said received cassette will slide off said platter.

2. A cassette feeder and storage mechanism according to claim 1 further including feeder means for transporting cassettes from said orientation means to a cassette loading station.

3. A cassette storage and feeder mechanism according to claim 1 wherein said rotatable platter comprises a pair of oppositely disposed side wall surfaces, and said stop means comprises a pair of projecting surfaces extending towards one another from said side wall surfaces.

4. A cassette storage and feeder mechanism according to claim 3 wherein said rotation means comprises a pneumatic rotary drive mechanism having a rotable drive shaft supporting said platter, and said control means comprises means for sensing when a cassette is disposed on said platter and thereafter operating said rotary drive mechanism so as to rotate said platter.

5. A cassette storage and feeder mechanism according to claim 4 wherein said control means comprises an amplifier valve.

6. A cassette storage and feeder mechanism according to claim 5 wherein said control means comprises first, second, third and fourth holes in said platter, a first groove in a first surface of said platter connecting said first and second holes, and a second groove in said first surface of said platter connecting said third and fourth holes, and further wherein said control means comprises means for sensing when selected ones of said first, second, third and fourth holes are aligned with a selected number of a plurality of pressure-sensing apertures.

7. A cassette storage and feeder mechanism according to claim 6 wherein said platter comprises a top surface and a bottom surface, said first, second, third and fourth holes extend through said platter so as to connect said top surface and said bottom surface, and first and second grooves are formed in said top surface.

8. A cassette storage and feeder mechanism according to claim 6 wherein said platter comprises a top surface and a bottom surface, said first and third holes extend through said platter so as to connect said top surface and said bottom surface, said second and fourth holes extend upward from said bottom surface and terminate short of said top surface, and said first and second grooves are formed in said bottom surface.

* * * * *

UNITED STATES PATENT AND TRADEMARK OFFICE
CERTIFICATE OF CORRECTION

PATENT NO. : 4595327
DATED : June 17, 1986
INVENTOR(S) : George M. Woodley

It is certified that error appears in the above-identified patent and that said Letters Patent is hereby corrected as shown below:

Claim 1, column 19, line 49, "108" should be -- 180 --.

Signed and Sealed this

Ninth Day of September 1986

[SEAL]

Attest:

DONALD J. QUIGG

Attesting Officer

Commissioner of Patents and Trademarks